US012695196B2

(12) United States Patent
Ip et al.

(10) Patent No.: US 12,695,196 B2
(45) Date of Patent: Jul. 28, 2026

(54) ANTENNA APPARATUS, ANTENNA DEVICE, AND IMPEDANCE TUNING MECHANISM

(71) Applicant: WISTRON NEWEB CORPORATION, Hsinchu (TW)

(72) Inventors: Sin Sze Ip, Hsinchu (TW); Wei-Shan Chang, Hsinchu (TW); Ting-Huei Chen, Hsinchu (TW); Chao-Tsu Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 79 days.

(21) Appl. No.: 18/882,903

(22) Filed: Sep. 12, 2024

(65) Prior Publication Data

US 2025/0210868 A1 Jun. 26, 2025

(30) Foreign Application Priority Data

Dec. 26, 2023 (TW) ................................ 112150672

(51) Int. Cl.
*H01Q 9/04* (2006.01)
*H01Q 1/48* (2006.01)

(52) U.S. Cl.
CPC ............. *H01Q 9/0442* (2013.01); *H01Q 1/48* (2013.01)

(58) Field of Classification Search
CPC ........ H01Q 9/0442; H01Q 9/065; H01Q 9/06; H01Q 9/0485; H01Q 1/48; H01Q 1/38; H01Q 1/2225
See application file for complete search history.

(56) References Cited

U.S. PATENT DOCUMENTS

2005/0280503 A1* 12/2005 Lee ......................... H01L 21/02
257/E23.179
2007/0096852 A1 5/2007 Lawrence et al.
(Continued)

FOREIGN PATENT DOCUMENTS

CN 108390153 * 8/2018
JP 2009135867 A 6/2009
(Continued)

OTHER PUBLICATIONS

Search Report issued on Apr. 23, 2025 for EP application No. 24212960.9.

*Primary Examiner* — Awat M Salih
(74) *Attorney, Agent, or Firm* — McClure, Qualey & Rodack, LLP

(57) ABSTRACT

An antenna apparatus includes a carrier, an impedance tuning mechanism corresponding in position to the carrier, and an antenna mechanism that is disposed on the impedance tuning mechanism. The impedance tuning mechanism includes a grounding layer disposed on the carrier and an impedance tuning layer spaced apart from the grounding layer. Moreover, a projection region defined by orthogonally projecting the impedance tuning layer onto the grounding layer is located inside of an outer edge of the grounding layer. The impedance tuning layer has at least one elongated slit recessed from an outer contour thereof to a center thereof. The antenna mechanism is applied to a center frequency. A thickness of the impedance tuning mechanism is within a range from 0.4% to 25% of a wavelength corresponding to the center frequency.

22 Claims, 12 Drawing Sheets

(56) References Cited

U.S. PATENT DOCUMENTS

| | | | | |
|---|---|---|---|---|
| 2008/0230866 | A1* | 9/2008 | Kulp | H01L 21/67248 438/54 |
| 2010/0035539 | A1* | 2/2010 | Yoshida | H01Q 1/2225 455/1 |
| 2015/0357718 | A1* | 12/2015 | Singh | H01Q 1/48 343/702 |
| 2017/0040663 | A1 | 2/2017 | Ito | |
| 2018/0254665 | A1 | 9/2018 | Inoue et al. | |
| 2021/0098894 | A1* | 4/2021 | Haviv | H01Q 21/062 |

FOREIGN PATENT DOCUMENTS

| | | | |
|---|---|---|---|
| JP | 2018148784 | A | 9/2018 |
| TW | 200921988 | A | 5/2009 |
| WO | 2015166834 | A1 | 11/2015 |

* cited by examiner

ANTENNA APPARATUS, ANTENNA DEVICE, AND IMPEDANCE TUNING MECHANISM

CROSS-REFERENCE TO RELATED PATENT APPLICATION

This application claims the benefit of priority to Taiwan Patent Application No. 112150672, filed on Dec. 26, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an impedance adjustment, and more particularly to an antenna apparatus, an antenna device, and an impedance tuning mechanism.

BACKGROUND OF THE DISCLOSURE

Conventional impedance tuning mechanisms provided for adjusting antenna impedance are mostly limited under a specific configuration (e.g., patch antennas), such that the conventional impedance tuning mechanism is difficult to be further improved for increasing its value.

SUMMARY OF THE DISCLOSURE

In response to the above-referenced technical inadequacies, the present disclosure provides an antenna apparatus, an antenna device, and an impedance tuning mechanism for effectively improving on the issues associated with conventional impedance tuning mechanisms.

In order to solve the above-mentioned problems, one of the technical aspects adopted by the present disclosure is to provide an antenna apparatus, which includes a carrier, an impedance tuning mechanism corresponding in position to the carrier, and an antenna mechanism that is disposed on the impedance tuning mechanism. The impedance tuning mechanism includes a grounding layer disposed on the carrier and an impedance tuning layer that is spaced apart from the grounding layer. Moreover, a projection region defined by orthogonally projecting the impedance tuning layer onto the grounding layer is located inside of an outer edge of the grounding layer. The impedance tuning layer has at least one elongated slit recessed from an outer contour thereof to a center thereof. The antenna mechanism is configured to be applied to a center frequency, wherein a thickness of the impedance tuning mechanism is within a range from 0.4% to 25% of a wavelength corresponding to the center frequency.

In order to solve the above-mentioned problems, another one of the technical aspects adopted by the present disclosure is to provide an impedance tuning mechanism, which includes a grounding layer and an impedance tuning layer spaced apart from the grounding layer. Moreover, a projection region defined by orthogonally projecting the impedance tuning layer onto the grounding layer is located inside of an outer edge of the grounding layer. The impedance tuning layer has at least one elongated slit recessed from an outer contour thereof to a center thereof.

In order to solve the above-mentioned problems, yet another one of the technical aspects adopted by the present disclosure is to provide an antenna device, which includes an impedance tuning mechanism and an antenna mechanism that is disposed on the impedance tuning mechanism. The impedance tuning mechanism includes a grounding layer and an impedance tuning layer that is spaced apart from the grounding layer. Moreover, a projection region defined by orthogonally projecting the impedance tuning layer onto the grounding layer is located inside of an outer edge of the grounding layer. A slit is recessed in the impedance tuning layer. The antenna mechanism is configured to be applied to a center frequency, wherein a thickness of the impedance tuning mechanism is within a range from 0.4% to 25% of a wavelength corresponding to the center frequency.

Therefore, through a new structural design of the impedance tuning layer (e.g., the at least one elongated slit or the slit) and the cooperation between the grounding layer and the impedance tuning layer provided in the antenna apparatus, the antenna device, or the impedance tuning mechanism of the present disclosure, the impedance tuning mechanism can be applied to the antenna mechanism by using a thinner thickness thereof and can have a better antenna efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
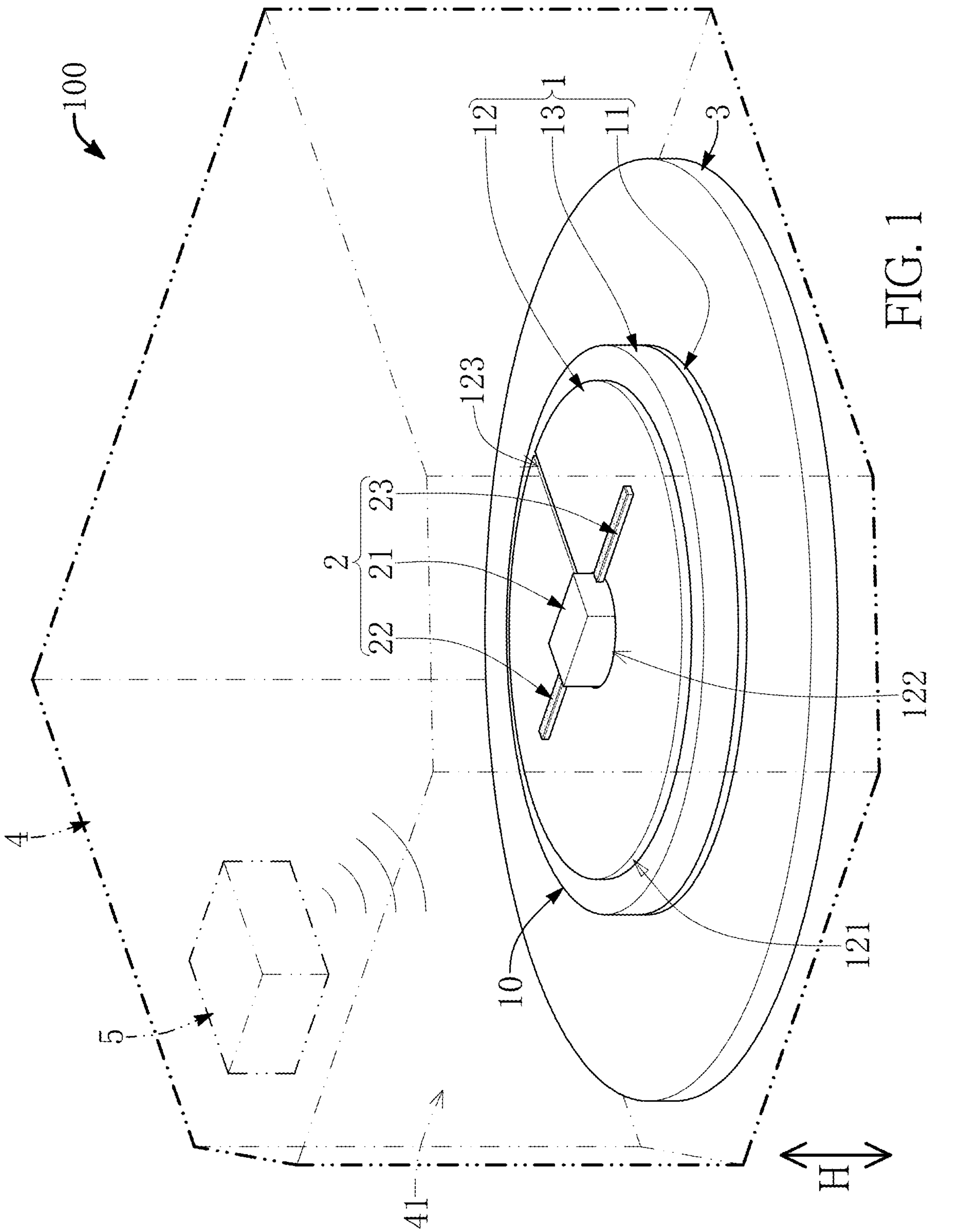
FIG. 1 is a schematic perspective view of an antenna apparatus according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
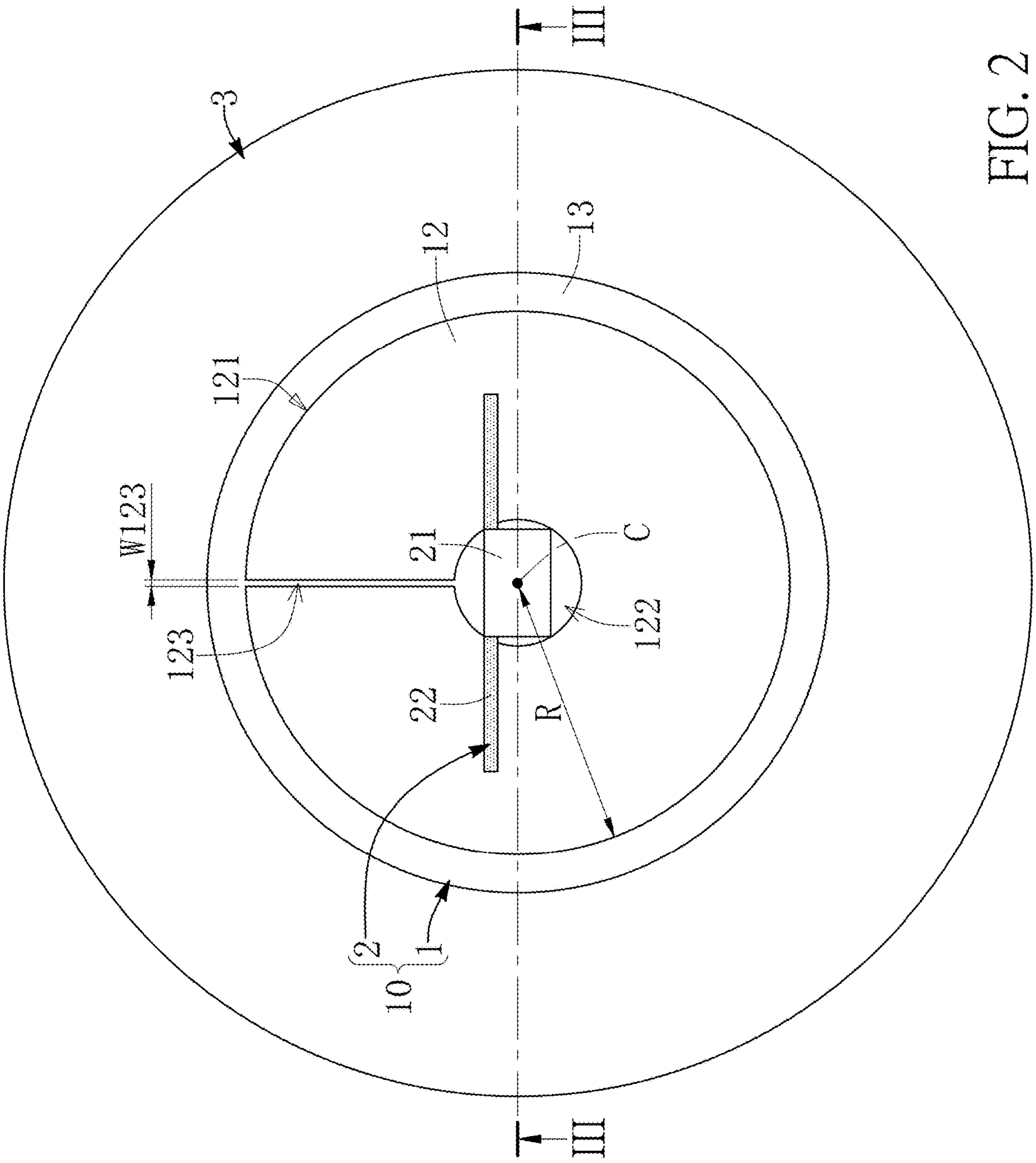
FIG. 2 is a schematic top view of FIG. 1 when a box and a reader are omitted.
Figure 3:
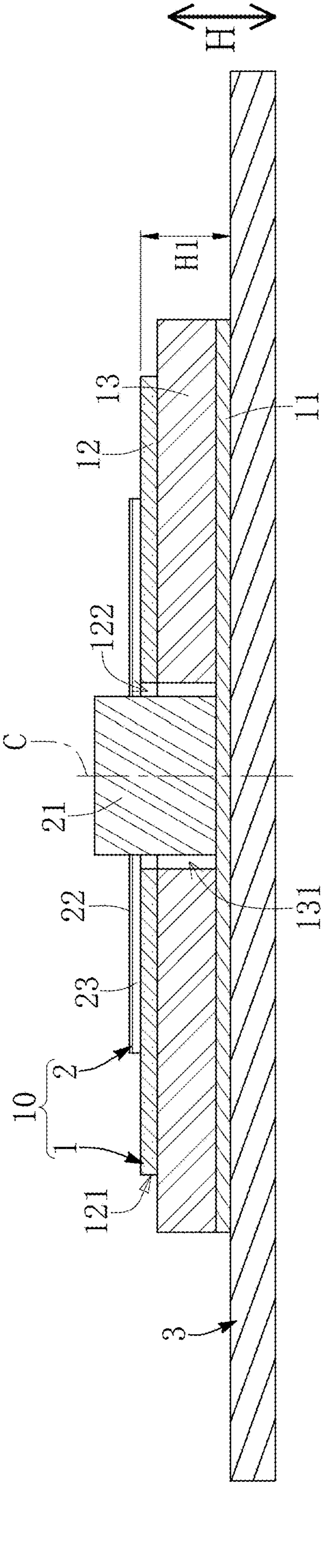
FIG. 3 is a schematic cross-sectional view taken along line III-III of FIG. 2.
Figure 4:
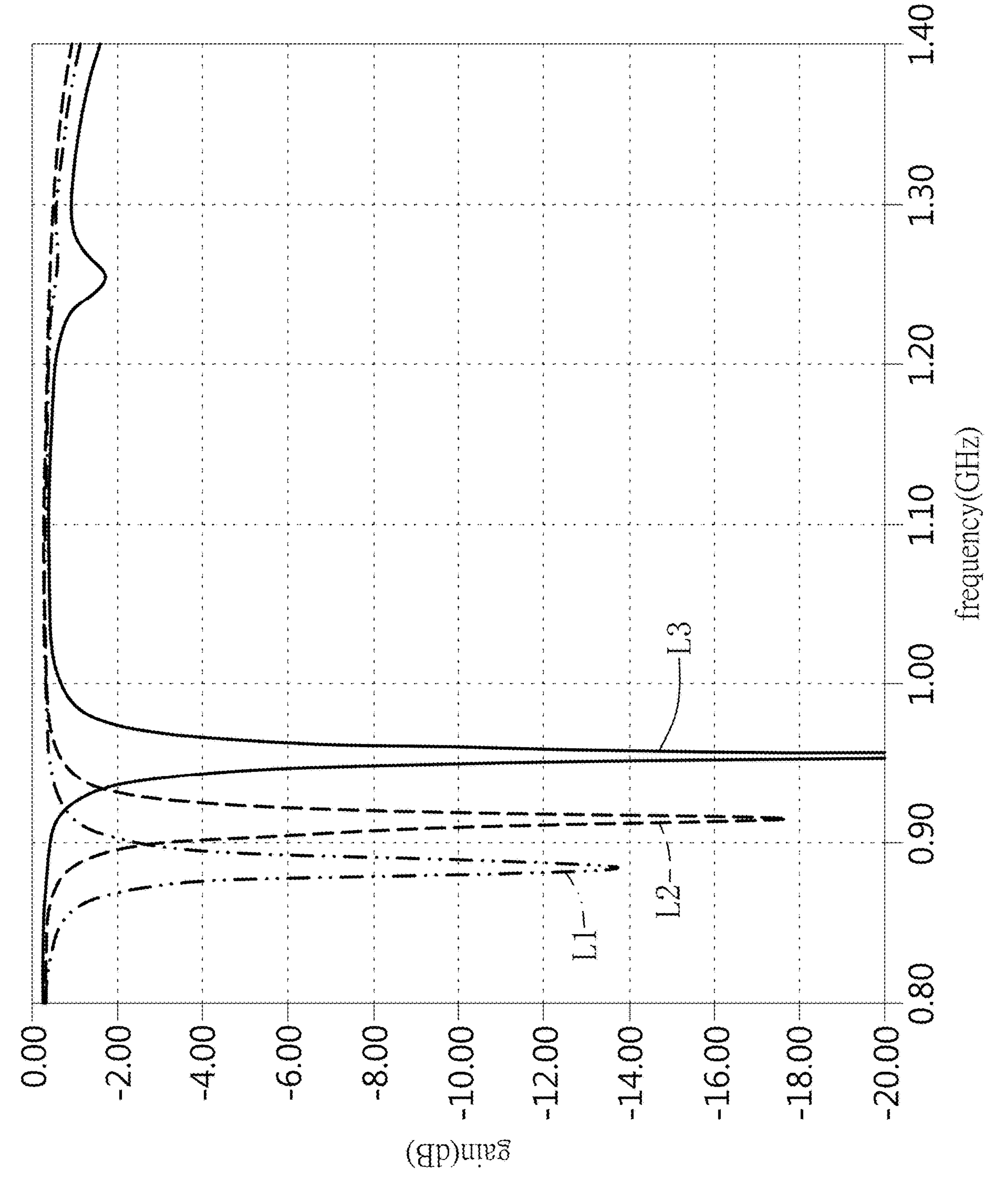
FIG. 4 is a schematic diagram showing a simulation test of the antenna apparatus according to the first embodiment of the present disclosure.

Referring to FIG. 1 to FIG. 9, a first embodiment of the present disclosure is provided. As shown in FIG. 1 to FIG. 3, the present embodiment provides an antenna apparatus 100, which preferably includes a carrier 3, an antenna mechanism 2 spaced apart from the carrier 3, an impedance tuning mechanism 1 disposed between the carrier 3 and the antenna mechanism 2, a box 4 receiving the above components therein, and a reader 5 that is assembled to the box 4, but the present disclosure is not limited thereto.

For example, in other embodiments of the present disclosure not shown in the drawings, at least one of the box 4 and the reader 5 of the antenna apparatus 100 can be omitted according to design requirements; or, the impedance tuning mechanism 1 and the antenna mechanism 2 are jointly defined as an antenna device 10 that can be independently used (e.g., sold) or can be used in cooperation with other components; or, the impedance tuning mechanism 1 can be independently used (e.g., sold) or can be used in cooperation with other components.

In the present embodiment, the carrier 3 is a flat and sheet-like structure and is a high dielectric loss medium (e.g., a wave absorber, a wafer, or a metal sheet), but the present disclosure is not limited thereto. The box 4 has a plurality of receiving spaces 41, and the carrier 3, the impedance tuning mechanism 1, and the antenna mechanism 2 are jointly arranged in one of the receiving spaces 41. The reader 5 is configured to read signals transmitted from the antenna mechanism 2, thereby obtaining a specific position of the carrier 3 arranged in the box 4. It should be noted that even though the antenna apparatus 100 in the present embodiment is applied in a semiconductor field, the box 4 can be a front opening unified pod (FOUP), and the carrier 3 can be a wafer, but the present disclosure is not limited thereto.

The impedance tuning mechanism 1 corresponds in position to the carrier 3, and the antenna mechanism 2 is disposed on the impedance tuning mechanism 1. In other words, the impedance tuning mechanism 1 is sandwiched between the carrier 3 and the antenna mechanism 2. The antenna mechanism 2 is configured to be applied to a center frequency, and a thickness H1 of the impedance tuning mechanism 1 is within a range from 0.4% to 25% of a wavelength corresponding to the center frequency.

Specifically, the impedance tuning mechanism 1 in the present embodiment includes a grounding layer 11 disposed on the carrier 3, an impedance tuning layer 12 spaced apart from the grounding layer 11 along a thickness direction H, and a dielectric layer 13 that is sandwiched between the grounding layer 11 and the impedance tuning layer 12. Moreover, a resonant frequency of the impedance tuning layer 12 can be adjusted through a size of the impedance tuning layer 12 (e.g., the resonant frequency of the impedance tuning layer 12 can be presented as curved lines L1, L2, L3 shown in FIG. 4). The size of the impedance tuning layer 12 is preferably provided as follows: a center C of the impedance tuning layer 12 and an outer contour 121 of the impedance tuning layer 12 have a layout distance R therebetween that is within a range from 25% to 45% of the wavelength, but the present disclosure is not limited thereto.

Moreover, the impedance tuning layer 12 is preferably arranged directly above the grounding layer 11, such that the grounding layer 11 is capable of shielding one side of the impedance tuning layer 12. In other words, a projection region defined by orthogonally projecting the impedance tuning layer 12 onto the grounding layer 11 falls within or is located inside of an outer edge of the grounding layer 11.

In addition, the dielectric layer 13 is made of an insulating material and has a relative permittivity that is within a range from 1 to 6 and that can be adjusted or changed according to design requirements, but the present disclosure is not limited thereto. For example, in other embodiments of the present disclosure not shown in the drawings, the dielectric layer 13 of the impedance tuning mechanism 1 can be omitted (i.e., the dielectric layer 13 can be an air dielectric layer).

The antenna mechanism 2 includes an electronic component 21 (e.g., a sensor chip) disposed on the impedance tuning mechanism 1, a sensing antenna 22 electrically coupled to the electronic component 21, and an insulating layer 23 that is disposed on the impedance tuning layer 12 and that carries the sensing antenna 22. In other words, the impedance tuning layer 12 and the sensing antenna 22 are spaced apart from each other through the insulating layer 23.

In the present embodiment, the impedance tuning layer 12 has an opening 122 that is provided for allowing the electronic component 21 to be arranged therein, the dielectric layer 13 has an accommodating hole 131 that is in spatial communication with the opening 122, and the electronic component 21 is arranged in the opening 122 and the accommodating hole 131 and is disposed on the grounding layer 11.

Specifically, the opening 122 is preferably arranged on the center C of the impedance tuning layer 12, an area of the opening 122 is less than or equal to 10% of an area surrounded by the outer contour 121 of the impedance tuning layer 12, and the accommodating hole 131 is not greater than the opening 122 and enables a part of the grounding layer 11 to be exposed therefrom for providing the electronic component 21 to be disposed on the part of the grounding layer, but the present disclosure is not limited thereto. For example, in other embodiments of the present disclosure not shown in the drawings, the arrangement of the opening 122 can have an offset relative to the center C of the impedance tuning layer 12; or, the accommodating hole 131 does not entirely penetrate through the dielectric layer 13 and a depth of the accommodating hole 131 can be adjusted according to design requirements; or, the impedance tuning layer 12 can be provided without the opening 122, the dielectric layer 13 can be provided without the accommodating hole 131, and the electronic component 21 is directly disposed on the impedance tuning layer 12.

Moreover, an antenna projection region defined by orthogonally projecting the sensing antenna 22 onto a top surface of the impedance tuning layer 12 is entirely located on the top surface and does not cover any slit. In other words, a part of the impedance tuning layer 12 corresponding in position to the sensing antenna 22 along the thickness direction H is preferably formed without any slit, but the present disclosure is not limited thereto.

The above description describes the cooperation between the impedance tuning mechanism 1 and the antenna mechanism 2, and the impedance tuning mechanism 1 can have structural designs according to practical requirements for having a better operation performance. The following description describes some examples selected from the structural designs of the impedance tuning mechanism 1 (as shown in FIG. 5 to FIG. 9), but the present disclosure is not limited thereto.

It should be noted that the outer contour 121 of the impedance tuning layer 12 disclosed in the following description of the present embodiment is a circle. However, in other embodiments of the present disclosure not shown in the drawings, the outer contour 121 of the impedance tuning layer 12 can be adjusted or changed according to design requirements (e.g., a polygon).

Figure 5:
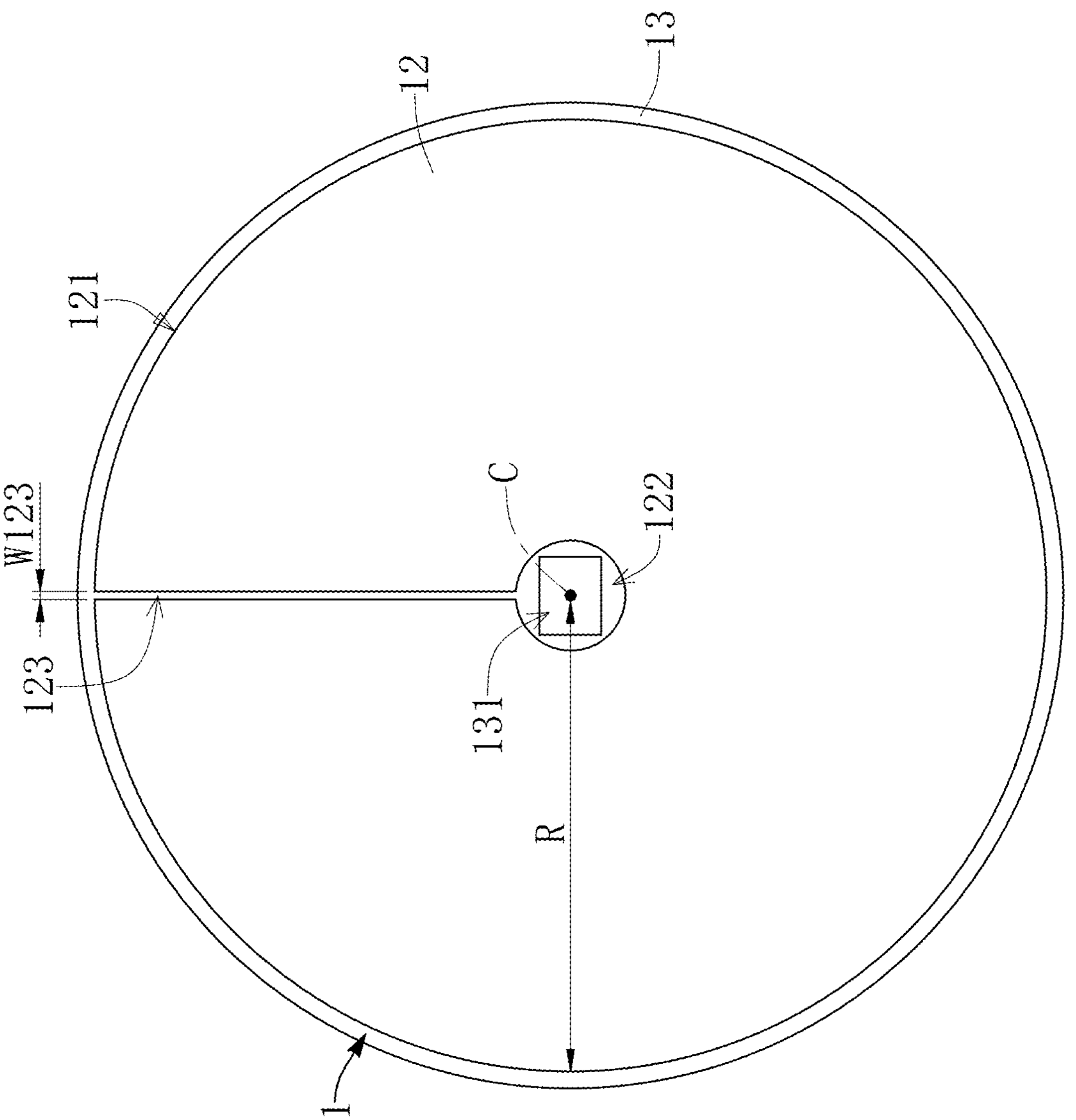
FIG. 5 is a schematic top view showing an impedance tuning mechanism having a first configuration according to the first embodiment of the present disclosure.

As shown in FIG. 3 and FIG. 5, the impedance tuning layer 12 has an elongated slit 123 recessed from the outer contour 121 thereof to the center C thereof. In other words, the elongated slit 123 has a straight line shape and is in spatial communication with the opening 122, and the elongated slit 123 penetrates through the impedance tuning layer 12 along the thickness direction H. In the present embodiment, the impedance tuning layer 12 can be formed with just the elongated slit 123 (and the opening 122). In addition, the elongated slit 123 has a width W123 that is preferably less than or equal to 3% of the wavelength. Accordingly, when the impedance tuning layer 12 shown in FIG. 5 is applied in the antenna device 10, an antenna efficiency of the antenna device 10 is approximately at least 0.239. The antenna efficiency in the present embodiment is defined by dividing gain by directivity.

Figure 6:
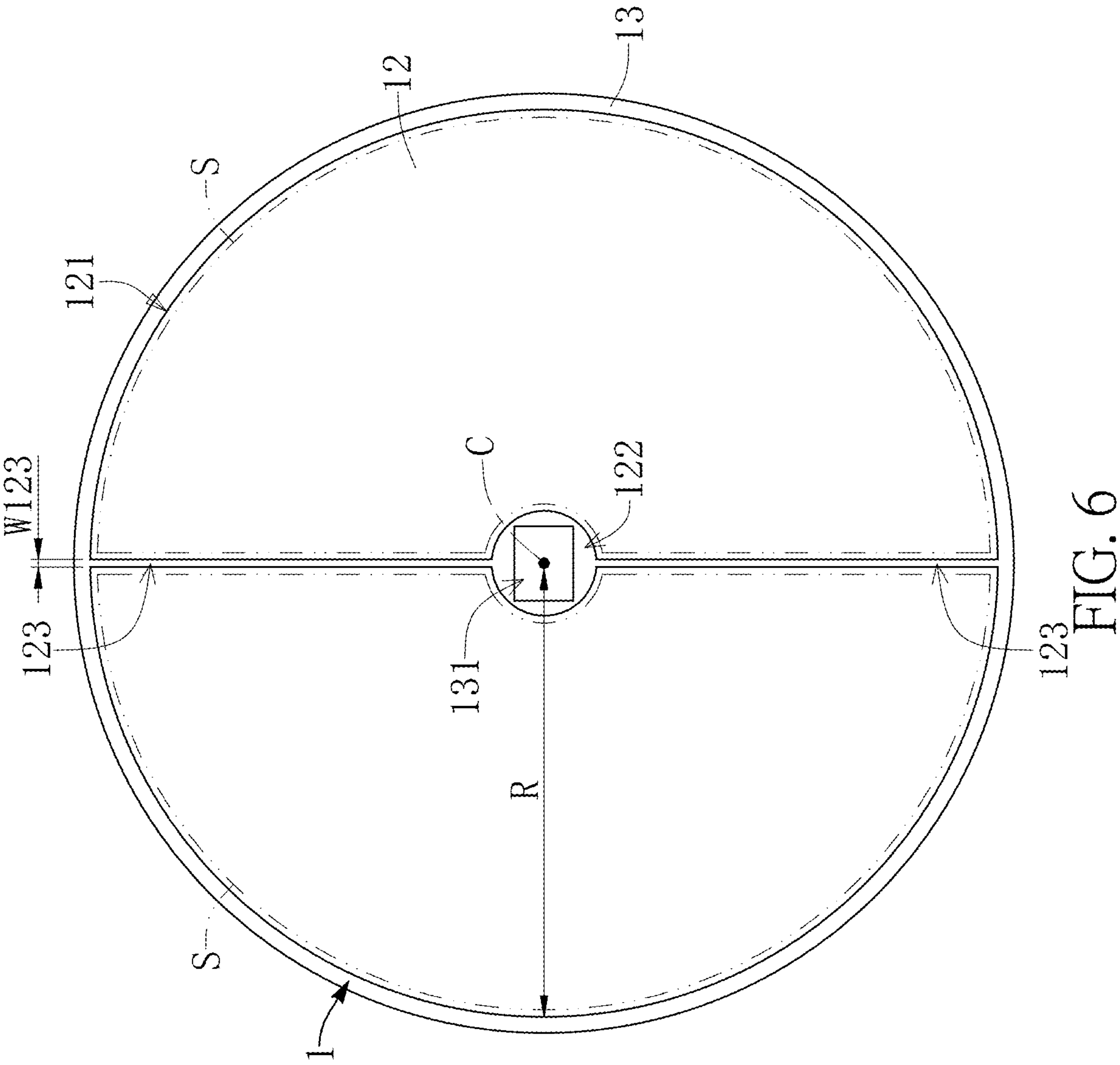
FIG. 6 is a schematic top view showing the impedance tuning mechanism having a second configuration according to the first embodiment of the present disclosure.
Figure 7:
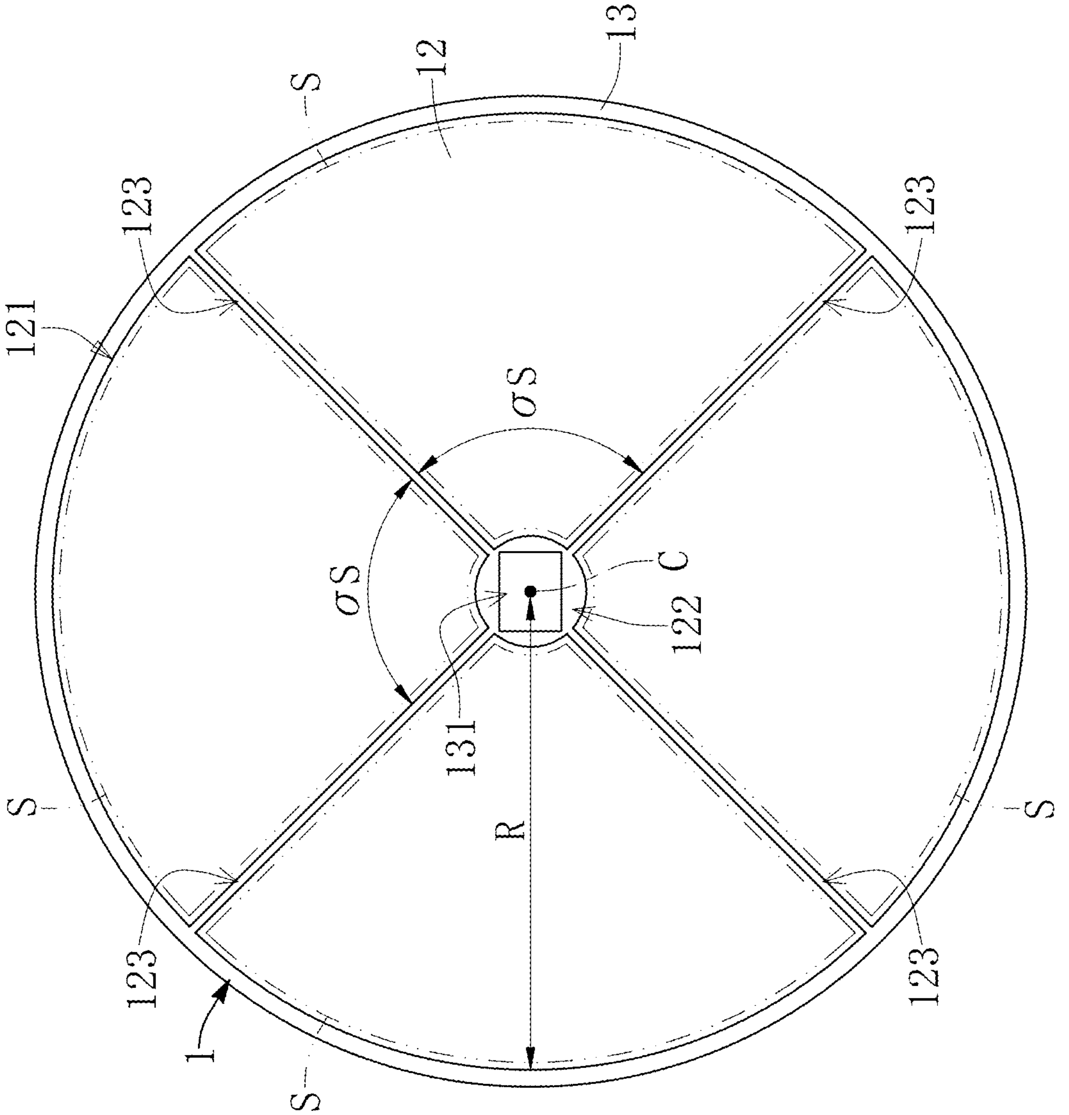
FIG. 7 is a schematic top view showing the impedance tuning mechanism having a third configuration according to the first embodiment of the present disclosure.

As shown in FIG. 3, FIG. 6, and FIG. 7, a quantity of the elongated slit 123 formed in the impedance tuning layer 12 can be N that is a positive integer and that is preferably an even number. The N number of the elongated slits 123 are preferably arranged in pairs, and each of the pairs of the elongated slits 123 is aligned in a straight line, such that the impedance tuning layer 12 is divided into an N number of tuning segments S separated from each other. Moreover, as shown in FIG. 7, each of the tuning segments S has a central angle σS with respect to the center C, and a difference between the central angles σS of any two of the tuning segments S is preferably less than or equal to 120 degrees.

In other words, the impedance tuning layer 12 can be formed with only the N number of the elongated slits 123 (and the opening 122). It should be noted that as shown in FIG. 6 of the present embodiment, when N is two, and when the impedance tuning layer 12 shown in FIG. 6 is applied in the antenna device 10, the antenna efficiency of the antenna device 10 is approximately at least 0.291. Moreover, as shown in FIG. 7, when N is four, and when the impedance tuning layer 12 shown in FIG. 7 is applied in the antenna device 10, the antenna efficiency of the antenna device 10 is approximately at least 0.286. In addition, in other embodiments of the present disclosure not shown in the drawings, N can be an even number of six or more; or, N can also be a positive integer greater than 1 and an odd number.

Figure 8:
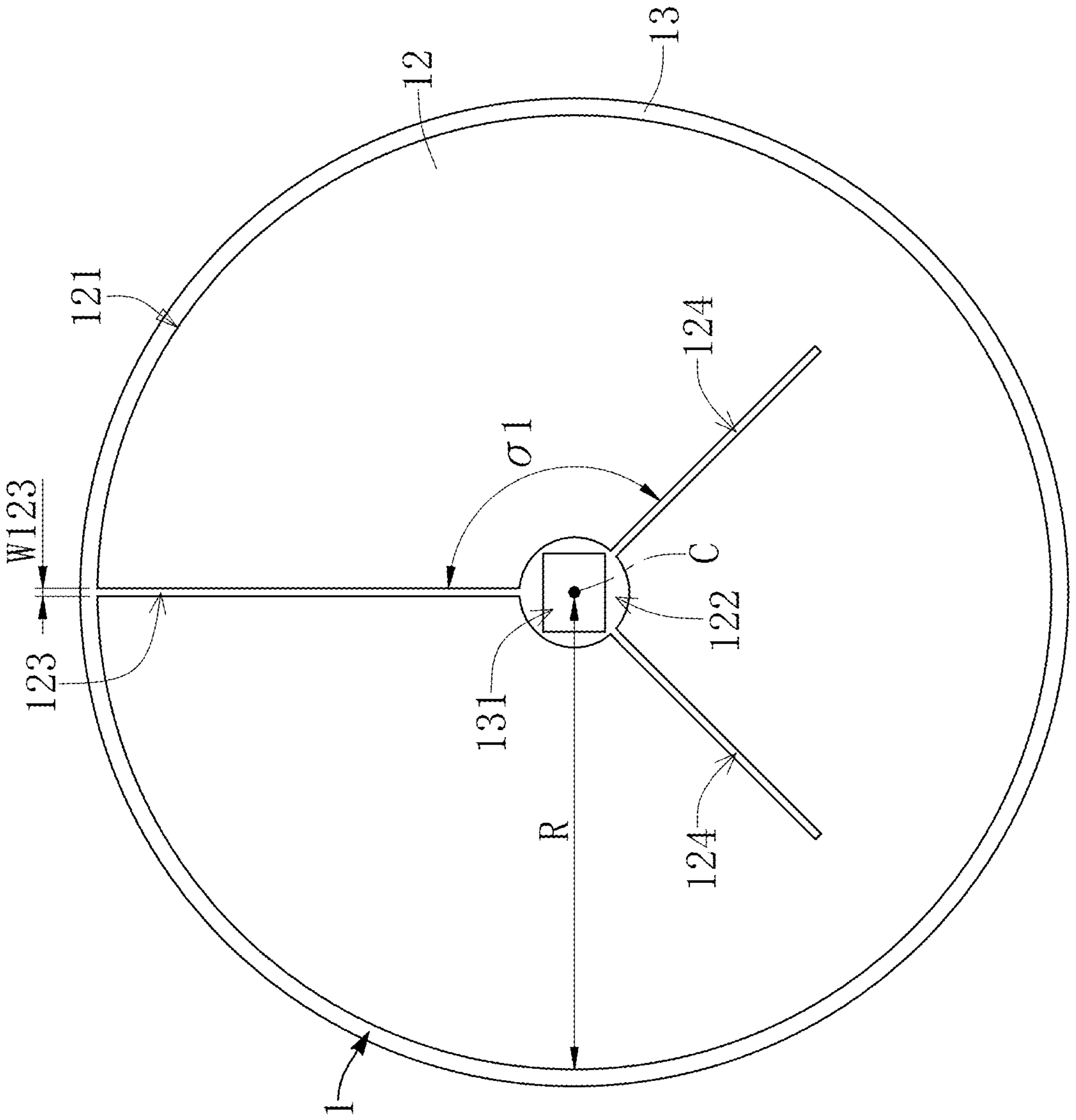
FIG. 8 is a schematic top view showing the impedance tuning mechanism having a fourth configuration according to the first embodiment of the present disclosure.

As shown in FIG. 3 and FIG. 8, the impedance tuning layer 12 having the elongated slit 123 can further have a plurality of inner slits 124 that are recessed from the center C toward the outer contour 121. Specifically, each of the inner slits 124 has a straight line shape and has a width that is preferably less than or equal to 3% of the wavelength, lengths of the inner slits 124 are substantially the same (e.g., the length of any one of the inner slits 124 can be within a range from 50% to 80% of the layout distance R), the inner slits 124 are in spatial communication with the opening 122 and are not in contact with the outer contour 121, and each of the inner slits 124 penetrates through the impedance tuning layer 12 along the thickness direction H, but the present disclosure is not limited thereto. For example, in other embodiments of the present disclosure not shown in the drawings, the lengths of the inner slits 124 can be slightly different from each other.

In other words, the impedance tuning layer 12 can be formed with just the inner slits 124 and the elongated slit 123 (or can be formed with just the inner slits 124, the elongated slit 123, and the opening 122). Moreover, as shown in FIG. 8 of the present embodiment, a quantity of the inner slits 124 formed in the impedance tuning layer 12 is two, and the elongated slit 123 and each of the two inner slits 124 preferably have a first angle σ1 therebetween that is within a range from 85 degrees to 165 degrees, preferably from 105 degrees to 165 degrees. Accordingly, when the impedance tuning layer 12 shown in FIG. 8 is applied in the antenna device 10, the antenna efficiency of the antenna device 10 is approximately at least 0.417.

Figure 9:
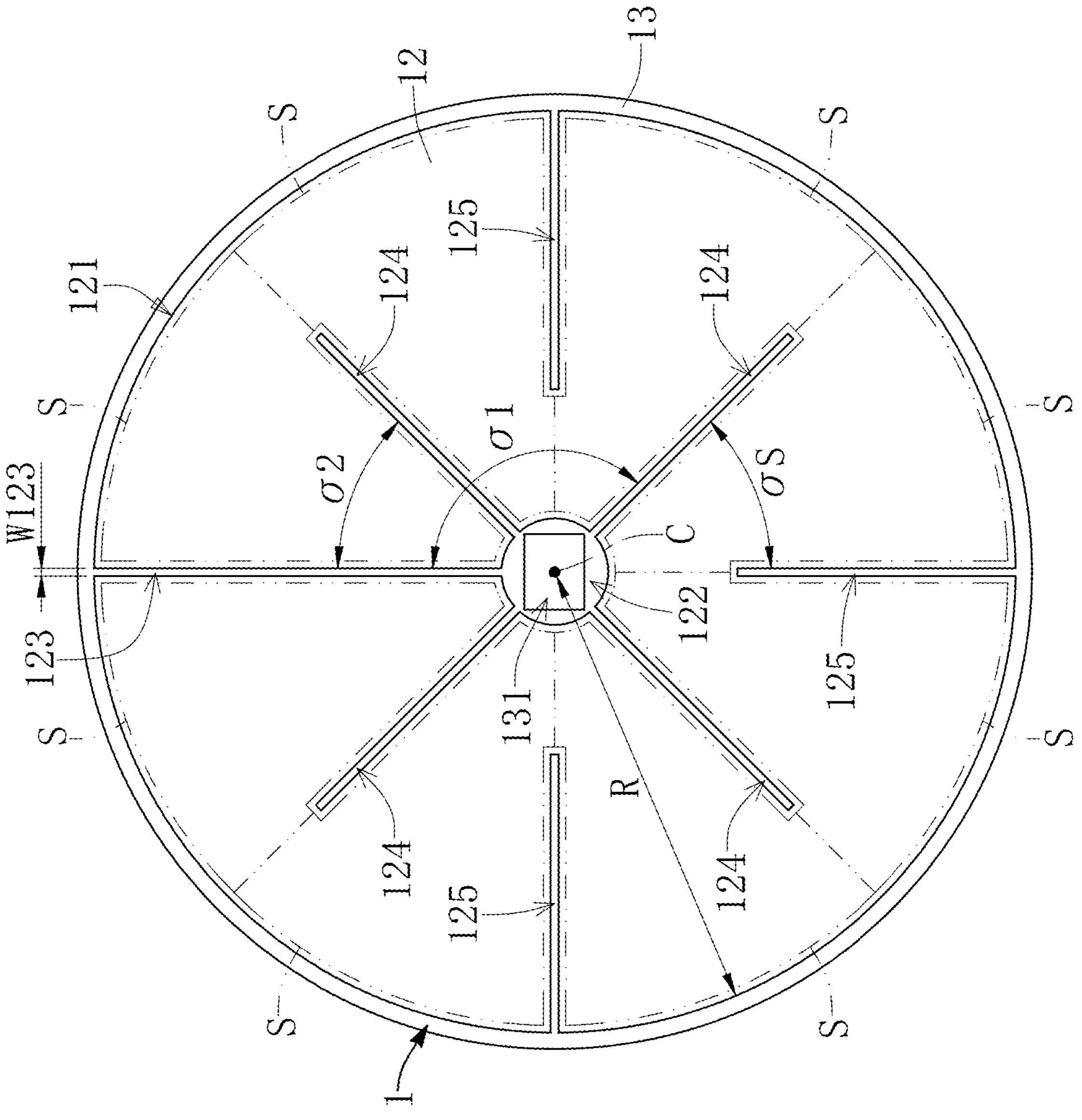
FIG. 9 is a schematic top view showing the impedance tuning mechanism having a fifth configuration according to the first embodiment of the present disclosure.

As shown in FIG. 3 and FIG. 9, the impedance tuning layer 12 having the elongated slit 123 and the inner slits 124 can further have a plurality of outer slits 125 that are recessed from the outer contour 121 toward the center C, and each of the outer slits 125 has a straight line shape and has a width that is preferably less than or equal to 3% of the wavelength.

Specifically, lengths of the outer slits 125 are substantially the same (e.g., the length of any one of the outer slits 125 can be within a range from 50% to 80% of the layout distance R), the outer slits 125 are not in contact with the center C (i.e., the outer slits 125 are not in spatial communication with the opening 12), and each of the outer slits 125 penetrates through the impedance tuning layer 12 along the thickness direction H, but the present disclosure is not limited thereto. For example, in other embodiments of the present disclosure not shown in the drawings, the lengths of the outer slits 125 can be slightly different from each other. In other words, the impedance tuning layer 12 can just be formed with the outer slits 125, the inner slits 124, and the elongated slit 123 (or can just be formed with the outer slits 125, the inner slits 124, the elongated slit 123, and the opening 122).

Furthermore, any two of the inner slits 124 adjacent to each other are provided with the elongated slit 123 arranged therebetween or one of the outer slits 125 arranged therebetween, such that the impedance tuning layer 12 is divided into a M number of tuning segments S, M being a positive integer. The M number of the tuning segments S are adjacent to each other and are of a single-piece structure. Moreover, each of the tuning segments S has a central angle σS with respect to the center C, and a difference between the central angles σS of any two of the tuning segments S is preferably less than or equal to 60 degrees.

As shown in FIG. 9 of the present embodiment, a quantity of the inner slits 124 formed in the impedance tuning layer 12 is four, and a quantity of the outer slits 125 formed in the impedance tuning layer 12 is three. Two of the four inner slits 124 arranged away from the elongated slit 123 each can be arranged with the elongated slit 123 to jointly define a first angle σ1 therebetween that is within a range from 85 degrees to 165 degrees, preferably from 105 degrees to 165 degrees. Another two of the four inner slits 124 arranged adjacent to the elongated slit 123 each can be arranged with the elongated slit 123 to jointly define a second angle σ2 therebetween that is within a range from 25 degrees to 65 degrees. Accordingly, when the impedance tuning layer 12 shown in FIG. 9 is applied in the antenna device 10, the antenna efficiency of the antenna device 10 is approximately at least 0.409.

In summary, as shown in FIG. 1 to FIG. 9, through the structural design of the impedance tuning layer 12 (e.g., the at least one elongated slit 123) and the cooperation between the grounding layer 11 and the impedance tuning layer 12 provided in the antenna apparatus 100, the antenna device 10, or the impedance tuning mechanism 1 of the present embodiment, the impedance tuning mechanism 1 can be applied to the antenna mechanism 2 by using a thinner thickness thereof (e.g., the thickness of the impedance tuning mechanism 1 is within a range from 0.4% to 25% of the wavelength) and can have a better antenna efficiency (e.g., at least 0.239).

Second Embodiment

Figure 10:
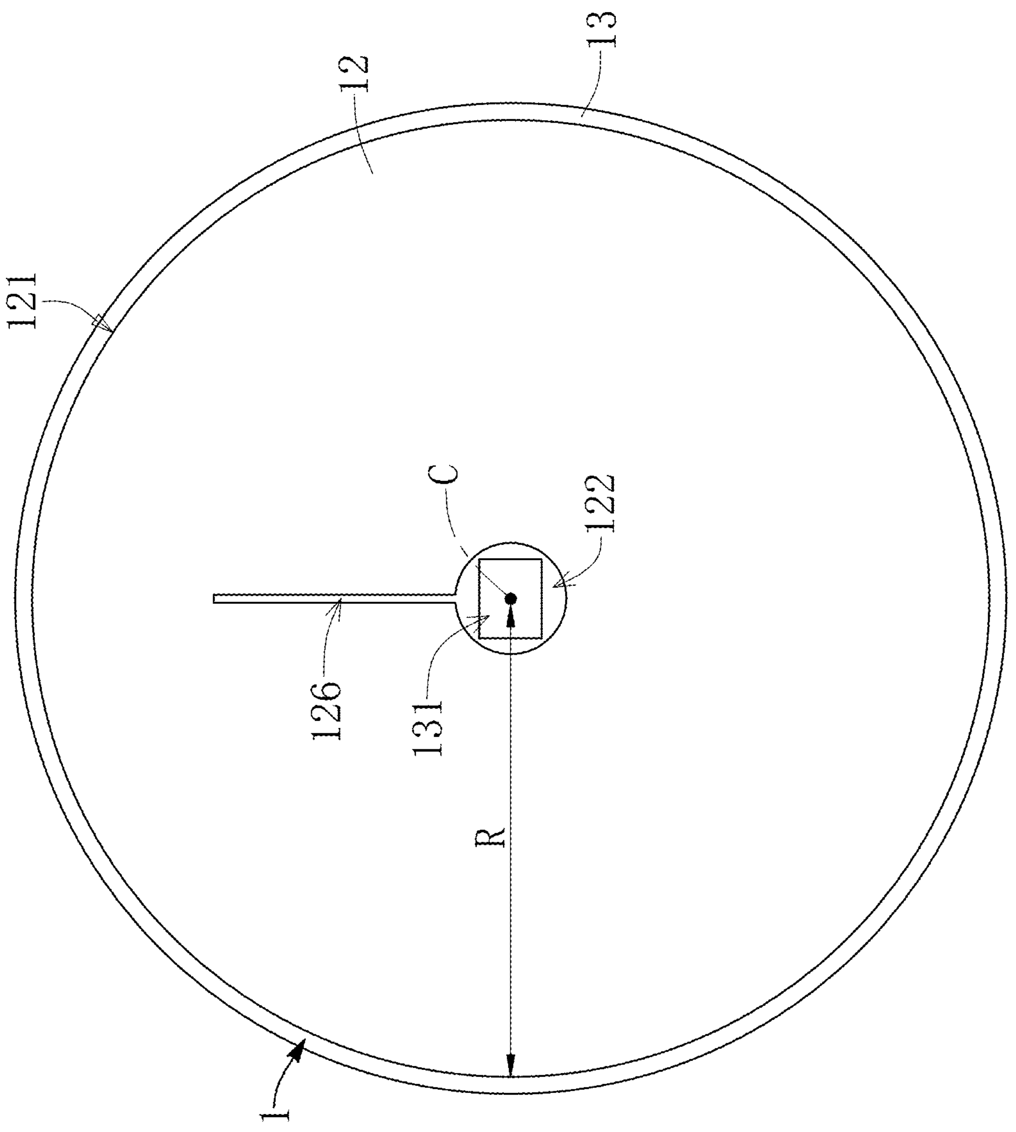
FIG. 10 is a schematic top view of the impedance tuning mechanism according to a second embodiment of the present disclosure.

Referring to FIG. 10, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments (e.g., the impedance tuning layer 12).

In the present embodiment, the impedance tuning layer 12 has a slit 126, and a width of the slit 126 is preferably less than or equal to 3% of the wavelength. The slit 126 is recessed from the center C toward the outer contour 121 of the impedance tuning layer 12, and the slit 126 is not in contact with the outer contour 121. The slit 126 has a straight line shape and penetrates through the impedance tuning layer 12 along the thickness direction H, and a length of the slit 126 is approximately greater than 50% of the layout distance R. In other words, the impedance tuning layer 12 of the present embodiment can be formed with just the slit 126 (and the opening 122).

Third Embodiment

Figure 11:
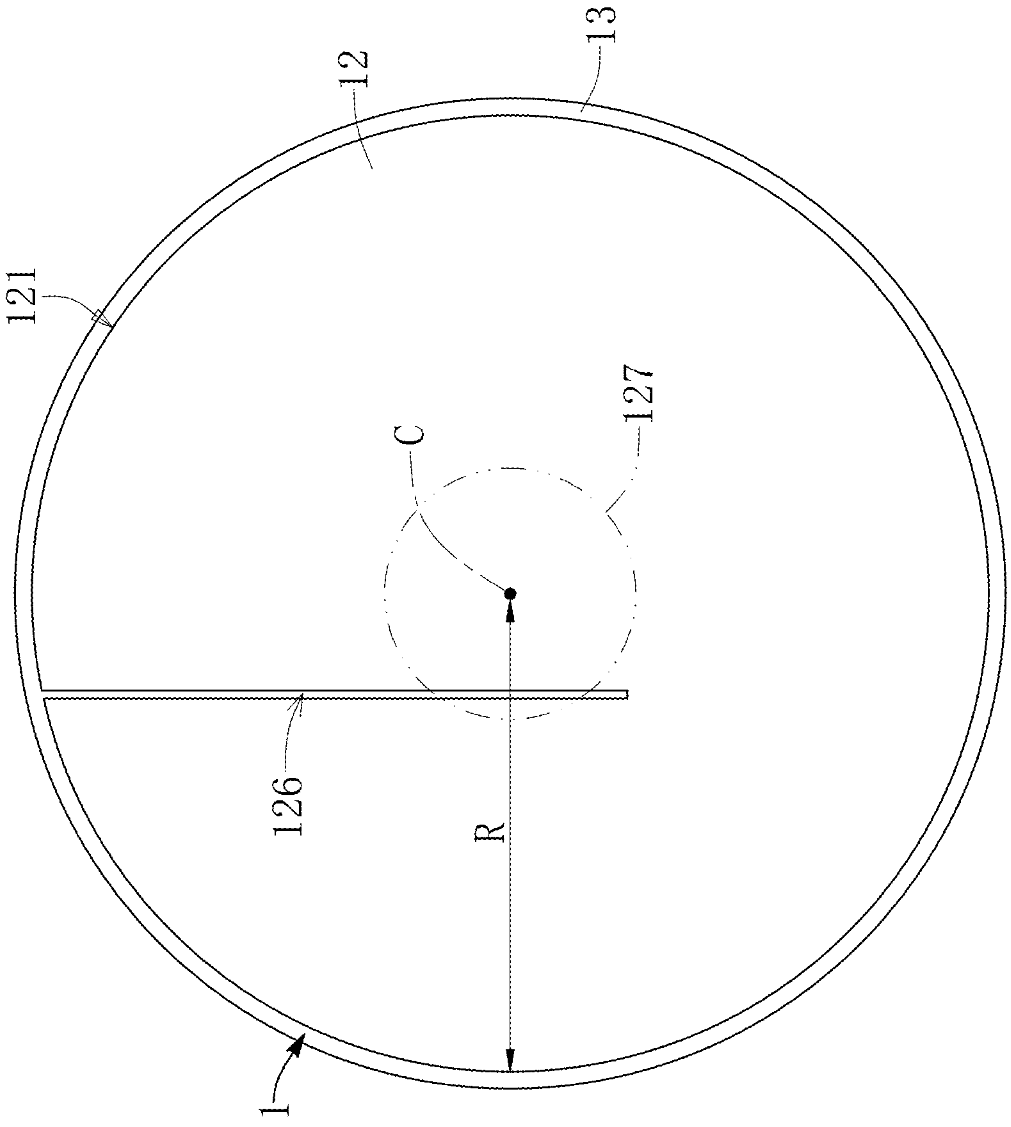
FIG. 11 is a schematic top view showing the impedance tuning mechanism having a first configuration according to a third embodiment of the present disclosure.
Figure 12:
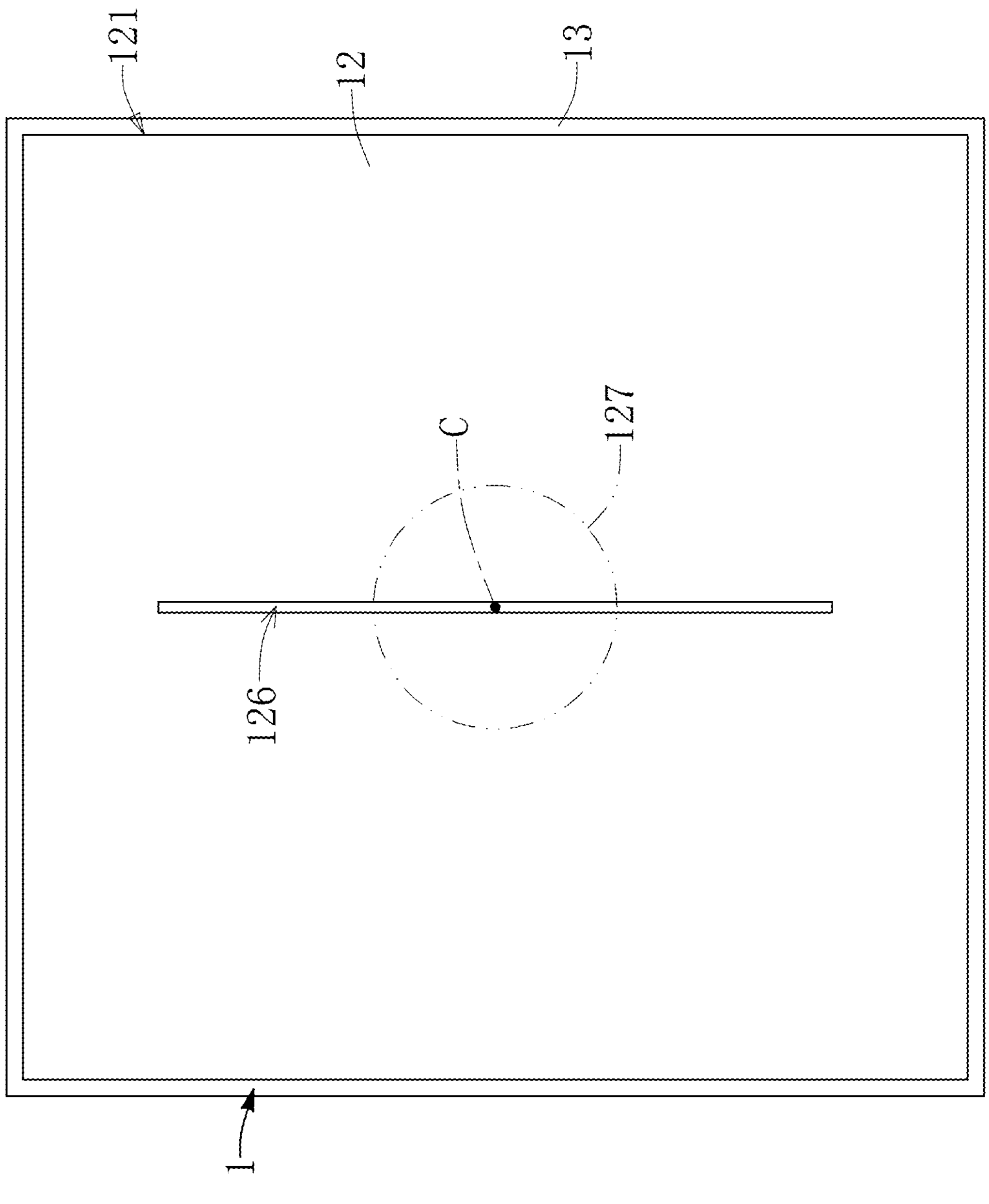
FIG. 12 is a schematic top view showing the impedance tuning mechanism having a second configuration according to the third embodiment of the present disclosure.

Referring to FIG. 11 and FIG. 12, a third embodiment of the present disclosure, which is similar to the first embodiment of the present disclosure, is provided. For the sake of brevity, descriptions of the same components in the first and third embodiments of the present disclosure will be omitted herein, and the following description only discloses different features between the first and third embodiments (e.g., the impedance tuning layer 12).

In the present embodiment, the impedance tuning layer 12 has a slit 126, and a width of the slit 126 is preferably less than or equal to 3% of the wavelength. The slit 126 has a straight line shape and penetrates through the impedance tuning layer 12 along the thickness direction H, and a length of the slit 126 is approximately greater than 50% of the layout distance R. In other words, the impedance tuning layer 12 of the present embodiment can be formed with only the slit 126.

Moreover, the impedance tuning layer 12 in the present embodiment defines a circular layout region 127 having a center of circle that is overlapped with the center C of the impedance tuning layer 12, and an area of the circular layout region 127 is within a range from 15% to 25% of an area surrounded by the outer contour 121 of the impedance tuning layer 12, but the present disclosure is not limited thereto. In the present embodiment, the slit 126 intersects (or passes through) the circular layout region 127.

Specifically, when the impedance tuning layer 12 meets the above conditions, the position of the slit 126 can be adjusted or changed according to design requirements. For example, as shown in FIG. 11, the slit 126 is recessed from the outer contour 121 of the impedance tuning layer 12 and does not pass through the center C; or, as shown in FIG. 12, the slit 126 is not in contact with the outer contour 121 (and passes through the center C).

Beneficial Effects of the Embodiments

In conclusion, through a new structural design of the impedance tuning layer (e.g., the at least one elongated slit or the slit) and the cooperation between the grounding layer and the impedance tuning layer provided in the antenna apparatus, the antenna device, or the impedance tuning mechanism of the present disclosure, the impedance tuning mechanism can be applied to the antenna mechanism by using a thinner thickness thereof and can have a better antenna efficiency.

Moreover, in the antenna apparatus, the antenna device, or the impedance tuning mechanism provided by the present disclosure, when a total thickness of the impedance tuning mechanism is less than 1% of the wavelength corresponding to the center frequency, the sensing antenna can normally irradiate and can have an antenna efficiency corresponding to the total thickness.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna apparatus, comprising:

a carrier;

an impedance tuning mechanism corresponding in position to the carrier and comprising a grounding layer disposed on the carrier; and an impedance tuning layer spaced apart from the grounding layer, wherein a projection region defined by orthogonally projecting the impedance tuning layer onto the grounding layer is located inside of an outer edge of the grounding layer, and wherein the impedance tuning layer has at least one elongated slit recessed from an outer contour thereof to a center thereof, and the impedance tuning layer has a plurality of outer slits recessed from the outer contour toward the center, and wherein the outer slits are not in contact with the center of the impedance tuning layer; and an antenna mechanism disposed on the impedance tuning mechanism and configured to be applied to a center frequency, wherein a thickness of the impedance tuning mechanism is within a range from 0.4% to 25% of a wavelength corresponding to the center frequency.

2. The antenna apparatus according to claim 1, further comprising a box having a plurality of receiving spaces, wherein the carrier, the impedance tuning mechanism, and the antenna mechanism are jointly arranged in one of the receiving spaces.

3. The antenna apparatus according to claim 2, further comprising a reader assembled to the box and configured to read signals transmitted from the antenna mechanism.

4. The antenna apparatus according to claim 1, wherein the carrier is a flat and sheet-like structure and is a high dielectric loss medium.

5. The antenna apparatus according to claim 1, wherein the antenna mechanism comprises:

an electronic component disposed on the impedance tuning mechanism;

a sensing antenna electrically coupled to the electronic component; and an insulating layer disposed on the impedance tuning layer and carrying the sensing antenna, wherein the impedance tuning layer and the sensing antenna are spaced apart from each other through the insulating layer.

6. The antenna apparatus according to claim 5, wherein the impedance tuning layer has an opening that is in spatial communication with the at least one elongated slit, and the electronic component is arranged in the opening, and wherein an area of the opening is less than or equal to 10% of an area surrounded by the outer contour of the impedance tuning layer.

7. The antenna apparatus according to claim 6, wherein the impedance tuning mechanism comprises a dielectric layer sandwiched between the grounding layer and the impedance tuning layer, wherein the dielectric layer has an accommodating hole that is in spatial communication with the opening, and wherein the electronic component is arranged in the opening and the accommodating hole and is disposed on the grounding layer.

8. The antenna apparatus according to claim 5, wherein an antenna projection region defined by orthogonally projecting the sensing antenna onto a top surface of the impedance tuning layer is entirely located on the top surface and does not cover any slit.

9. The antenna apparatus according to claim 1, wherein the outer contour and the center of the impedance tuning layer have a layout distance therebetween that is within a range from 25% to 45% of the wavelength.

10. The antenna apparatus according to claim 1, wherein the at least one elongated slit has a width that is less than or equal to 3% of the wavelength.

11. An impedance tuning mechanism, comprising:

a grounding layer; and an impedance tuning layer spaced apart from the grounding layer, wherein a projection region defined by orthogonally projecting the impedance tuning layer onto the grounding layer is located inside of an outer edge of the grounding layer;

wherein the impedance tuning layer has at least one elongated slit recessed from an outer contour thereof to a center thereof, and the impedance tuning layer has a plurality of outer slits recessed from the outer contour toward the center, and wherein the outer slits are not in contact with the center of the impedance tuning layer.

12. The impedance tuning mechanism according to claim 11, wherein a quantity of the at least one elongated slit is one, and the impedance tuning layer has two inner slits recessed from the center toward the outer contour, and wherein the two inner slits are not in contact with the outer contour, and the elongated slit and each of the two inner slits have a first angle therebetween that is within a range from 85 degrees to 165 degrees.

13. The impedance tuning mechanism according to claim 11, wherein a quantity of the at least one elongated slit is one, wherein the impedance tuning layer has a plurality of inner slits recessed from the center toward the outer contour, and wherein the inner slits are not in contact with the outer contour, and any two of the inner slits adjacent to each other are provided with the elongated slit arranged therebetween or one of the outer slits arranged therebetween.

14. The impedance tuning mechanism according to claim 13, wherein the impedance tuning layer is divided into a M number of tuning segments, M being a positive integer, and wherein the M number of the tuning segments are adjacent to each other and are of a single-piece structure.

15. The impedance tuning mechanism according to claim 11, wherein a quantity of the at least one elongated slit is N, where N is a positive integer, and the impedance tuning layer is divided into an N number of tuning segments separated from each other through the N number of the elongated slits.

16. The impedance tuning mechanism according to claim 15, wherein each of the tuning segments has a central angle with respect to the center, and a difference between the central angles of any two of the tuning segments is less than or equal to 120 degrees.

17. The impedance tuning mechanism according to claim 11, wherein the impedance tuning layer has an opening that is in spatial communication with the at least one elongated slit and that is arranged at the center of the impedance tuning layer, and the impedance tuning mechanism comprises a dielectric layer sandwiched between the grounding layer and the impedance tuning layer, and wherein the dielectric layer has an accommodating hole that is in spatial communication with the opening, and the dielectric layer has a relative permittivity being within a range from 1 to 6.

18. An antenna device, comprising:

an impedance tuning mechanism comprising:

a grounding layer; and an impedance tuning layer spaced apart from the grounding layer, wherein a projection region defined by orthogonally projecting the impedance tuning layer onto the grounding layer is located inside of an outer edge of the grounding layer, wherein a slit is recessed in the impedance tuning layer, and the impedance tuning layer has a plurality of outer slits recessed from an outer contour of the impedance tuning layer toward a center of the impedance tuning layer, and wherein the outer slits are not in contact with the center of the impedance tuning layer; and an antenna mechanism disposed on the impedance tuning mechanism and configured to be applied to a center frequency, wherein a thickness of the impedance tuning mechanism is within a range from 0.4% to 25% of a wavelength corresponding to the center frequency.

19. The antenna device according to claim 18, wherein the slit is recessed from the center of the impedance tuning layer toward the outer contour of the impedance tuning layer, and is not in contact with the outer contour.

20. The antenna device according to claim 18, wherein a center of the impedance tuning layer and an outer contour of the impedance tuning layer have a layout distance therebetween, and wherein a length of the slit is greater than 50% of the layout distance.

21. The antenna device according to claim 18, wherein the impedance tuning layer defines a circular layout region having a center of circle that is overlapped with the center of the impedance tuning layer, wherein an area of the circular layout region is within a range from 15% to 25% of an area surrounded by the outer contour of the impedance tuning layer, and wherein the slit intersects the circular layout region.

22. The antenna device according to claim 21, wherein the slit does not pass through the center of circle of the circular layout region.

* * * * *